Nov. 29, 1955 W. E. PARKINS 2,725,479
CALUTRON RECEIVERS
Filed Feb. 4, 1946 9 Sheets-Sheet 2
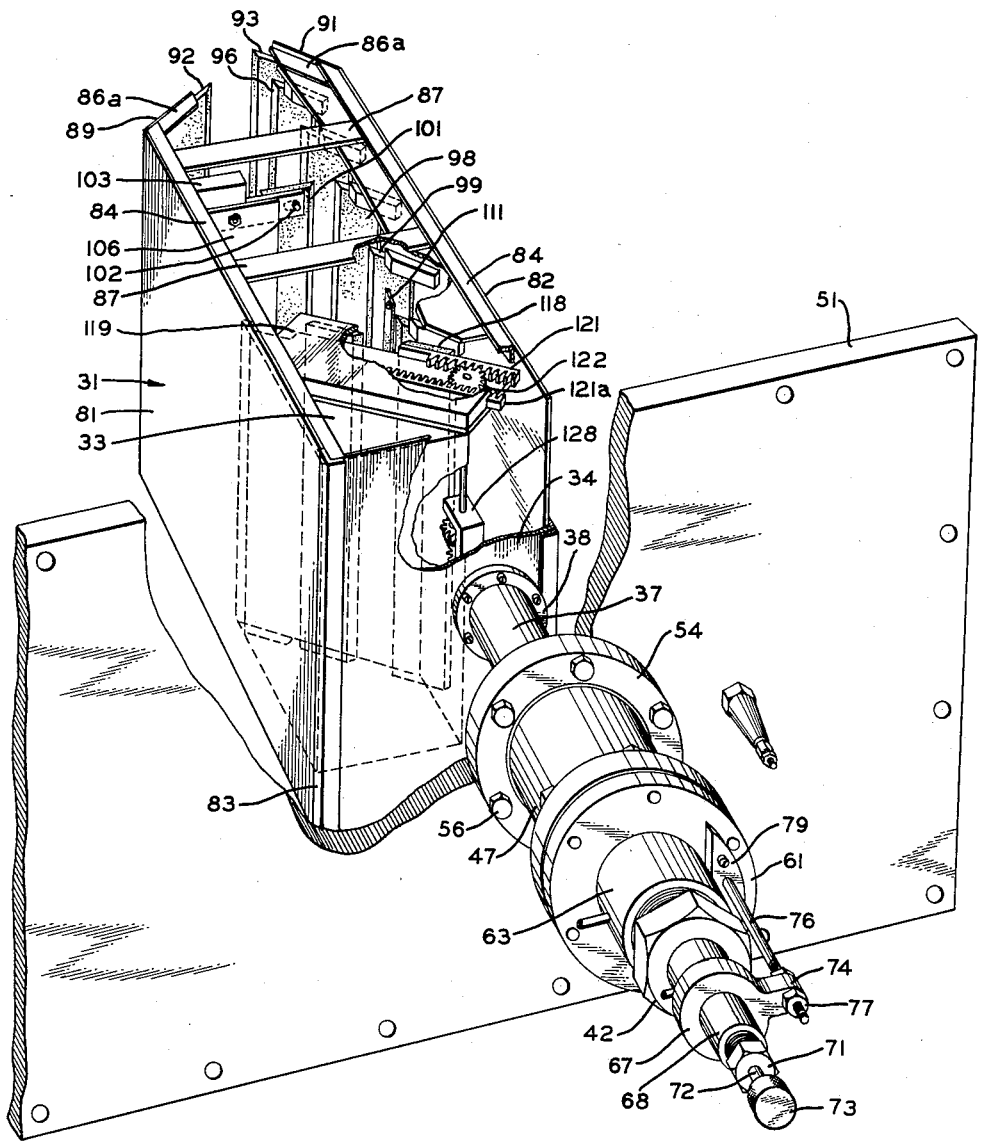
FIG_2_
INVENTOR.
WILLIAM E. PARKINS
BY
Robert A. Lavender

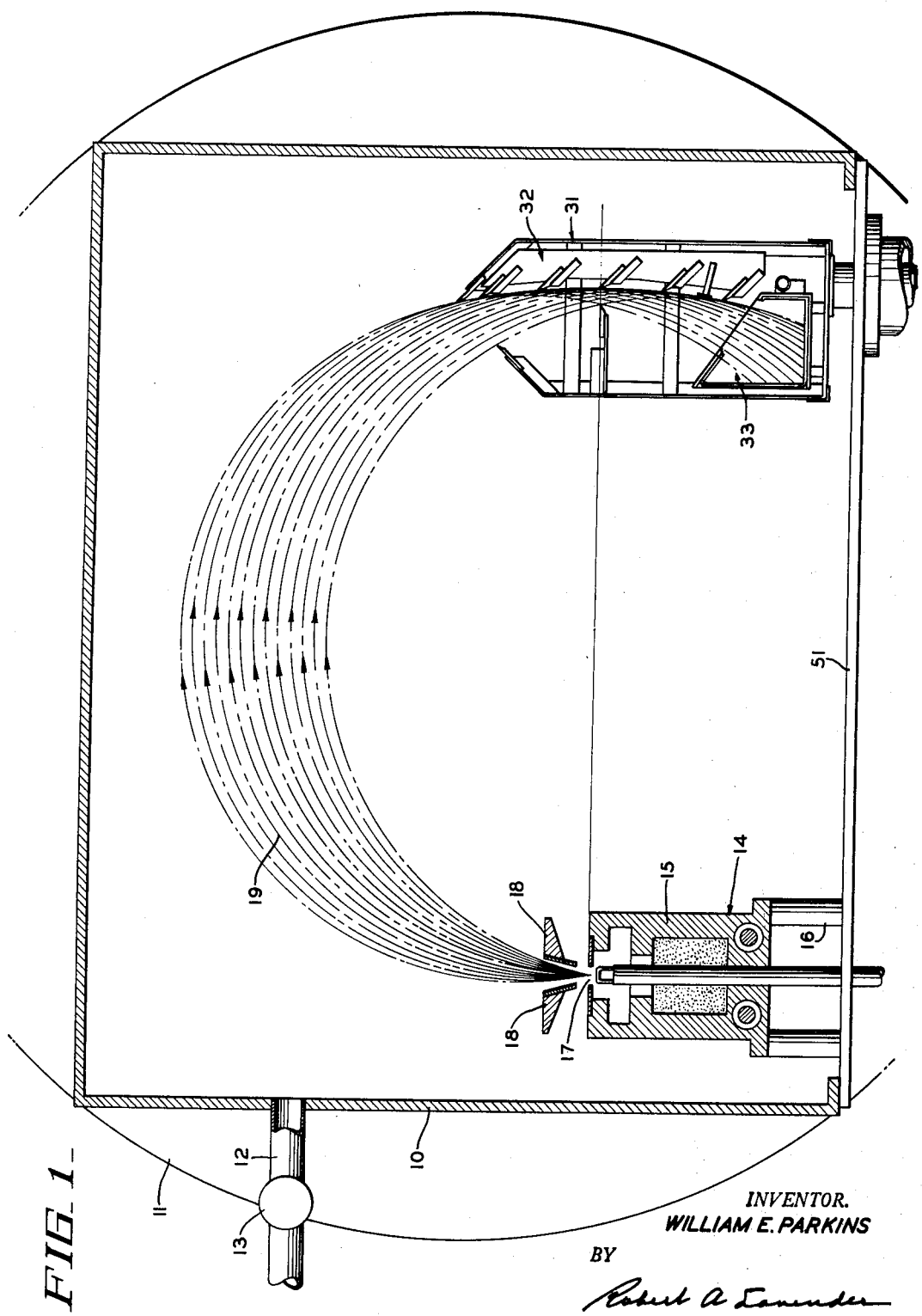

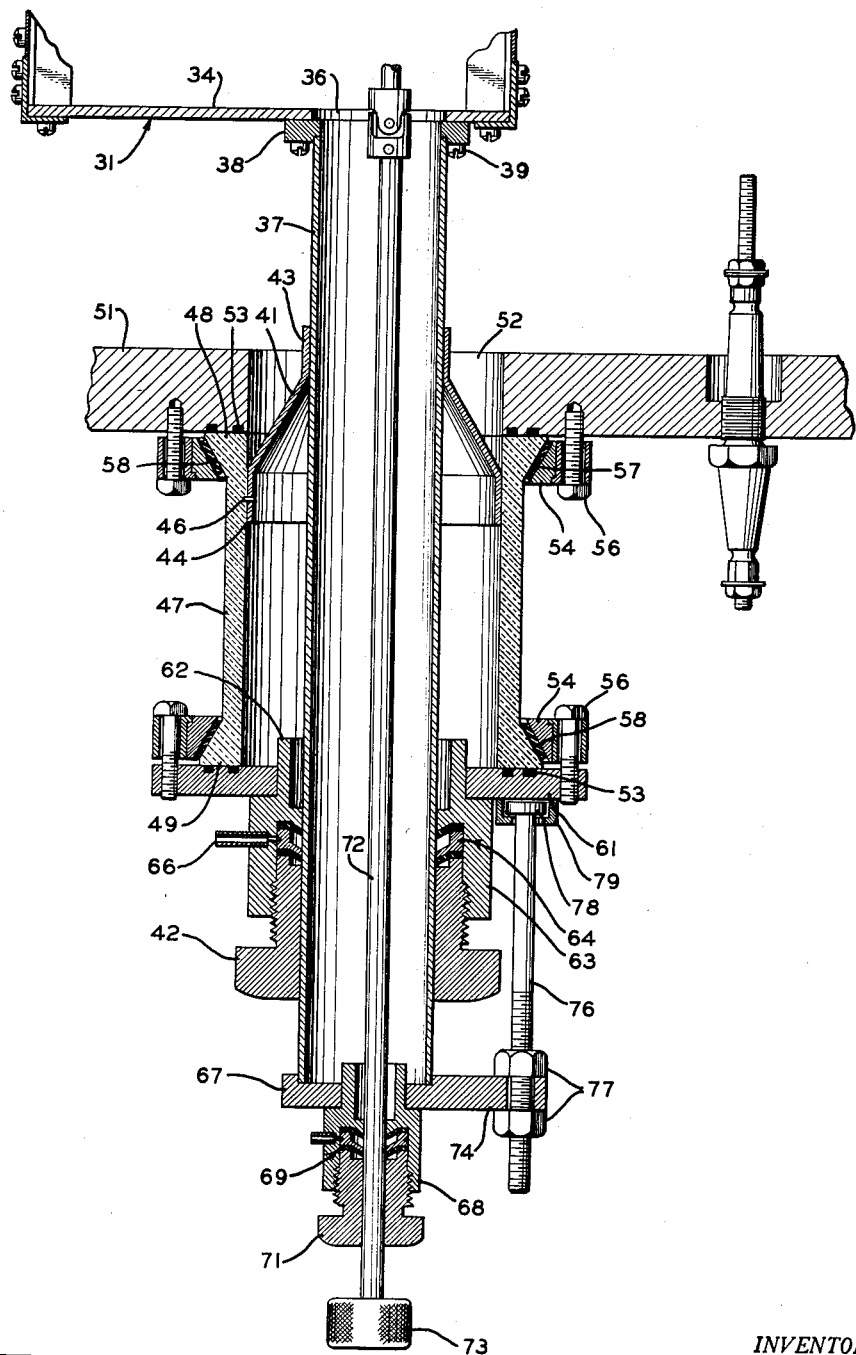

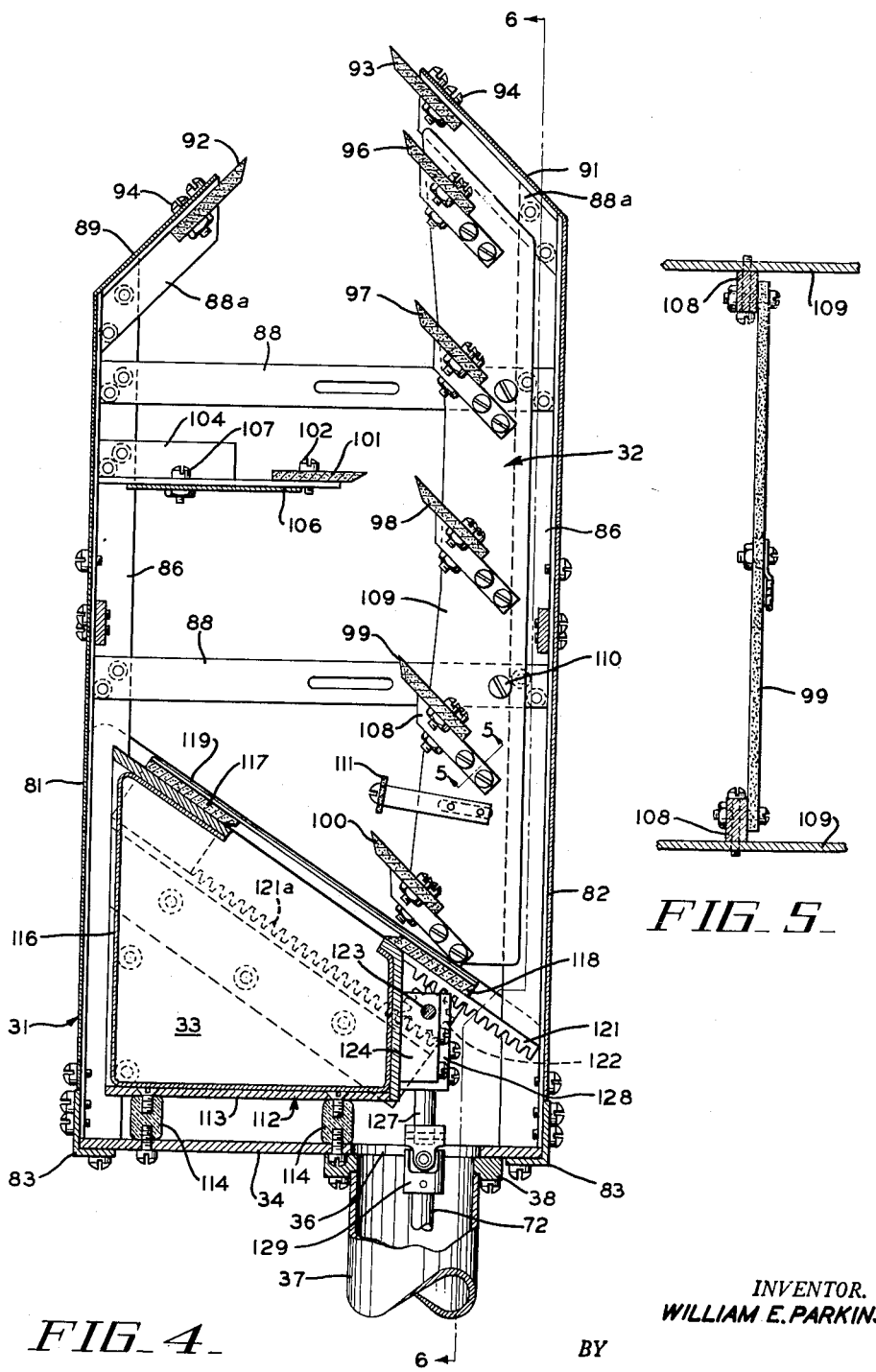

Nov. 29, 1955

W. E. PARKINS 2,725,479

CALUTRON RECEIVERS

Filed Feb. 4, 1946

INVENTOR.
WILLIAM E. PARKINS
BY
Robert A. Lavender

FIG_7_

Nov. 29, 1955

W. E. PARKINS 2,725,479

CALUTRON RECEIVERS

Filed Feb. 4, 1946

INVENTOR
WILLIAM E. PARKINS
BY

Nov. 29, 1955  W. E. PARKINS  2,725,479
CALUTRON RECEIVERS
Filed Feb. 4, 1946  9 Sheets-Sheet 9
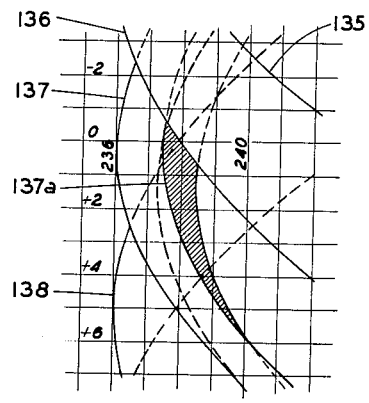
FIG. 11
FIG. 10
INVENTOR
WILLIAM E. PARKINS
BY

United States Patent Office 2,725,479
Patented Nov. 29, 1955

2,725,479

CALUTRON RECEIVERS

William E. Parkins, Berkeley, Calif., assignor to the United States of America as represented by the United States Atomic Energy Commission Application February 4, 1946, Serial No. 645,455

19 Claims. (Cl. 250—41.9)

This invention relates to the separation, based on difference in mass, of minute particles, such as atoms, and especially the separation of isotopes of an element, and the collection of a portion of an element, enriched with respect to a particular isotope on a scale yielding commercially useful quantities of the collected material.

The type of means or mechanism to which the invention relates, known as a "calutron," is of the character disclosed in the copending application of Ernest O. Lawrence, Serial No. 557,784, filed October 9, 1944, for "Methods of and Apparatus for Separating Materials," now Patent No. 2,709,222, and in particular involves improvements in the apparatus and method disclosed in the copending application of Stanley P. Frankel, Serial No. 613,357, filed August 29, 1945, for "Calutron Receivers."

The presently preferred form of the calutron comprises an evacuated tank placed between the poles of an electromagnet so that the evacuated space within the tank is pervaded with a magnetic field of high flux density. Within the tank there is provided a "source" or "source unit" that includes means for supplying the polyisotope as a vapor or gas to an ionizing region, ionizing apparatus for producing positively ionized particles from the vapor, and an accelerating device maintained at a relatively high negative electrical potential with respect to the ionizing apparatus for withdrawing the positive ions. The accelerating device imparts to the positive ions a predetermined energy in the form of substantially uniform velocities along paths generally normal to the direction of the magnetic field and toward a beam defining slit in the accelerating device disposed generally parallel to the direction of the magnetic field.

The accelerated ions are constrained to travel in a generally ribbon-shaped ion beam transversely to the magnetic field along arcuate paths having radii that vary with the masses of the particles. By virtue of the accelerating slit construction, the paths of ions of a given mass diverge to either side of a median path from a linear virtual focus, the angles of divergence being determined by the geometry of the ionizing and accelerating devices. This divergence of the paths of travel of the ions of a given mass continues through the first 90° of arcuate travel, and then the paths converge during the next 90° and cross each other in a region of focus approximately 180° from the source unit. The isotope ions of different masses arrive at respective areas of sharpest focus that lie in a common plane containing the linear virtual focus at the source unit, but, when processing the heavier elements, such as uranium, the respective areas of sharpest focus overlap when a practical minimum divergence of ions at the source unit is employed, thereby complicating separate collection of ions of different isotopes.

Because of certain geometrical relations considered in more detail hereinafter, the arcuate paths of the ions of a given mass (all of which paths are segments of circles of the same diameter) become internally tangent to an imaginary circular cylinder that is twice the diameter of the tangential paths, the axis of the imaginary cylinder being coincident with the linear virtual focus of the beam at the source unit. The locus of the points of tangency, for given angles of divergence of the ions to either side of a median path at the source unit, will be a segment of the imaginary cylinder subtending angles to either side of the 180° focus position equal to the maximum angles of divergence of ions at the source unit. Where the ion beam comprises ions of normal uranium, for example, the paths of all of the ions of greatest mass ($U^{238}$) will be internally tangent to the same imaginary cylinder having a predetermined diameter, while the paths of ions of a lesser given mass (for example, $U^{235}$) will all be internally tangent to a concentric imaginary cylinder having a slightly smaller diameter, the percentage difference in these diameters depending solely upon the mass difference of the respective ion components of the beam. By effecting a beam delimiting or shaving operation adjacent the 180° region of focus, a delimited portion of the beam rich in the isotope of greatest mass may be trapped while permitting the remainder of the beam rich in isotopes of lesser mass to pass beyond the 180° region of focus to a suitable collector.

The present invention relates particularly to the portion of a calutron provided in the target region and which will be referred to as a "receiver," the receiver being positioned in the general region of the 180° focus of the beam.

It is a general object of the invention to provide improved apparatus and methods for collecting a portion of a polyisotopic material enriched with respect to a particular isotope thereof.

Another object of the invention is to provide an improved ion receiver unit for intercepting all but a selected delimited portion of an ion beam while passing the delimited portion to a collector.

Another object of the invention is to provide an ion receiver unit for an ion beam of a divergent character which admits to a collector only those ions having predetermined effective masses and angles of travel.

Another object of the invention is to provide an ion receiver unit incorporating a delimiting vane system located in a region of focus of an ion beam for passing selected ions only.

Another object of the invention is to provide an electrical circuit for an ion receiver unit, the circuit being adapted to permit selective metering of electrical currents resulting from deionization of beam particles by various parts of the receiver.

Further object of the invention is to provide an electrical circuit for an ion receiver unit including a vane system for delimiting an ion beam, the circuit being adapted to permit selective metering of electrical currents resulting from deionization of beam particles by the respective vanes of the vane system.

Another object of the invention is to provide an ion receiver unit including a vane system having an electrode disposed therein to enable monitoring of the ion beam with respect to the vane system.

Another object of the invention is to provide a monitoring system for a calutron ion beam wherein ions of predetermined effective masses and angles of travel impinge upon a monitoring electrode for beam control purposes.

Other objects and advantages of the invention will be apparent from the following description of a preferred embodiment of the invention taken in connection with the accompanying drawings, in which:

Figure 1 is a schematic plan view, partially in section, showing a calutron embodying a receiver unit constructed in accordance with the instant invention;

Fig. 2 is a perspective view of the receiver unit and its mounting mechanism;

Fig. 3 is a horizontal sectional view of the mounting structure for the receiver unit;

Fig. 4 is a horizontal sectional view of the receiver unit;

Fig. 5 is a fragmentary sectional view of the receiver unit taken as indicated by the line 5—5 in Fig. 4 and illustrating the mounting of a beam delimiting vane;

Fig. 9 is a diagram illustrating the derivation of the mass-angle relation upon which Fig. 8 is based;

Fig. 10 is a fragmentary view of a modified form of vane system; and

Fig. 11 is a partial mass-angle diagram for the vane system of Fig. 10.

Figure 6:
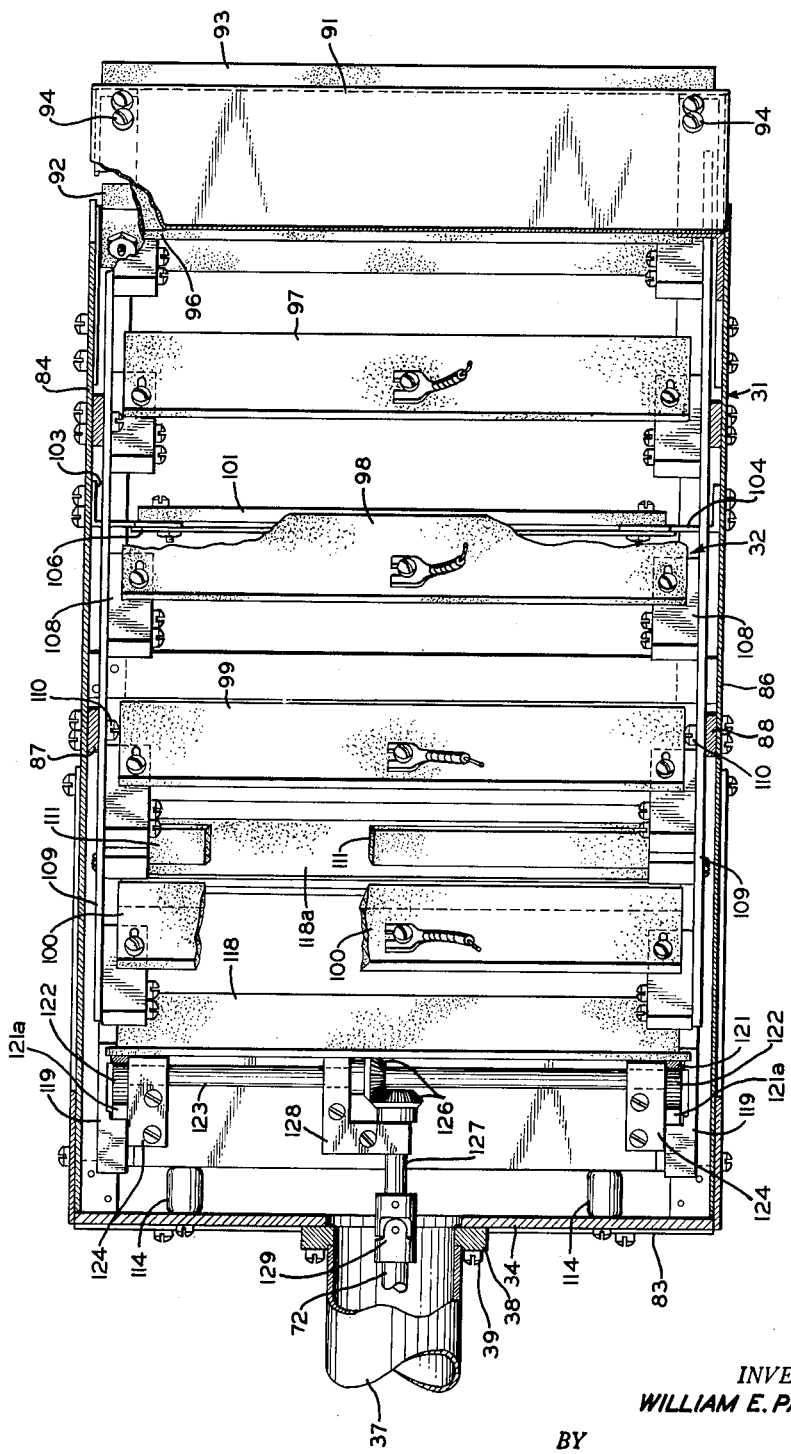
Fig. 6 is an elevational view of the receiver unit with certain parts shown in section, the section being taken as indicated by the line 6—6 in Fig. 4.

The calutron disclosed herein is of the general type disclosed in the application for United States Letters Patent of Ernest O. Lawrence, Serial No. 557,784, filed October 9, 1944 for "Methods of and Apparatus for Separating Materials," to which application reference is made for a complete disclosure of all of the operative parts of a calutron. Only such calutron parts will be disclosed in detail herein as seem necessary or desirable for understanding the instant invention.

The presently preferred embodiment of a calutron includes a tank 10, rectangular in plan, that is mounted between the pole faces 11 of the calutron magnet, one of the pole faces being seen in Fig. 1. In the present instance, the poles faces are vertically spaced apart and the lower pole face is illustrated. As a result of the arrangement of the pole faces, the direction of the magnetic field is perpendicular to the plane of the drawing, and, in the present instance, the polarity of the faces is so selected that the field is directed upwardly. The interior of the tank 10 is connected by a conduit 12 to suitable pumping apparatus 13 for maintaining a desired low pressure within the tank. Within the tank a source unit 14 is provided including a source block 15 that is mounted by suitable insulators 16 upon a wall 51 of the tank 10 and that contains apparatus for producing ionized particles for withdrawal through an exit opening 17 by means of a pair of spaced apart accelerator electrodes 18. In the arrangement illustrated, the source block 15 is maintained at a high positive potential, while the accelerating electrodes 18 are maintained at a more negative potential, in the present instance at ground, so that positive ions formed within the source block 15 are withdrawn to form an ion beam. For a further detailed description of a suitable source unit, reference is made to the above-identified Lawrence application.

As previously explained, the operation of the accelerating device and source unit effects the projection of the ions along paths that are variously divergent by angles between predetermined maxima to either side of a median ion path to form an ion beam as illustrated schematically at 19. In the present instance it has been assumed for illustrative purposes that the angular divergence of the ion paths to either side of the median ion path is 12°. It will be understood that for each ion mass there will be a similar distribution in the region of emergence of ions from between the accelerator electrodes and that subsequently the ions of a given mass will follow similar arcuate paths of a given radius. The radii of the paths for different isotopes of the charge material will vary in accordance with the mass of the respective isotope ions. For example, if normal uranium is employed as the charge material, the U+ ion beam is made up of ionized components of $U^{234}$, $U^{235}$ and $U^{238}$.

As previously explained, the ions of any given mass travel along arcuate paths that become internally tangent to an imaginary circular cylinder twice the diameter of the particular ion paths. In the present instance, the points of tangency extend 12° along the imaginary cylinder to either side of the 180° focal position.

In accordance with the instant invention, the difference in location of the cylinders of tangency of ions of different mass is utilized, as in the above-noted Frankel application, to effect separation of the ions on the basis of mass by intercepting ions of greatest mass adjacent the region of focus while passing ions of lesser mass to a collector. Also, in accordance with the invention, only ions having certain effective masses and less than selected predetermined maximum angles of departure from the source unit are admitted past the beam delimiting structure to the collector, in a manner more fully described hereinafter.

Referring particularly to Figs. 2, 3, and 4, the receiver unit includes a casing 31 that houses a vane system 32 and a collector pocket 33, both of which are referred to in greater detail in a later portion of this description. The housing 31 has a rear wall 34 that is apertured at 36. A supporting tube 37, having an end collar 38 secured thereto, as by brazing or welding, is secured to the end wall 34 of the receiver casing by suitable screws 39 that pass through the collar 38 into threaded engagement with the end wall 34, the collar 38 surrounding the aperture 36 in the rear wall 34.

In order to support the receiver unit for in-and-out adjustment with respect to the tank, the tube 37 is slidably supported within a supporting collar 41 and a packing nut 42 at spaced points along the length of the tube. The collar 41 is provided with a portion 43 of reduced diameter that engages the tube 37, and a portion of larger diameter 44 that is pinned at 46 to a supporting insulator 47 of suitable ceramic material. The tubular insulator 47 is provided with similar conical end flanges 48 and 49, the end flange 48 being held in abutting relation with the adjacent wall 51 of the tank about an aperture 52 formed therein and in engagement with suitable annular seal rings 53. The insulator 47 is held on the tank wall 51 by means of a retaining collar 54, apertured to pass securing cap screws 56 and having an internal frustroconical face 57 to mate with a complementary face of the end flange 48. A suitable rubber sealing ring or gasket 58 is interposed between the end flange 48 and the retaining collar 54. The end 49 of the tubular insulator 47 is similarly secured by a retaining collar 54, cap screws 56, and sealing ring 58 to an annular plate 61 having a pair of annular sealing rings 53 seated therein and engaging the end face of the flange 49. The annular plate 61 encompasses the reduced end 62 of an annular sealing housing 63, and may be secured in airtight relation thereto by brazing or the like. The housing 63 supports a seal 64 of the conventional Wilson type, having a pumpout conduit 66, and is internally threaded to receive the packing nut 42, referred to above.

From the above description, it will be noted that the receiver unit is mounted for movement in and out of the tank by means of the supporting tube 37, while excluding any leakage of air into the interior of the tank.

The exterior end of the supporting tube 37 (Fig. 3) carries an end collar 67 that may be brazed or soldered thereto, and that is apertured to receive a sealing housing 68, similar to the housing 63 and enclosing a similar Wilson type seal 69. The sealing housing 68 may also be brazed or soldered to the collar 67. A clamping nut 71 for the seal 69 is apertured to pass an adjusting rod 72 having a knurled handle 73, utilized for a purpose referred to hereinafter.

To control the in-and-out adjustment of the receiver unit, the end collar 67 (Figs. 2 and 3) of the supporting tube 37 is provided with a laterally extending arm 74, that is apertured to receive an adjusting screw 76, held in adjusted relation with respect thereto by a pair of nuts 77. A round, disk-like head 78 formed on one end of the screw 76 is rotatably disposed within a retaining fitting 79, suitably secured on the annular plate 61. By appropriate adjustment of the nuts 77, the tube 37 can be slid in and out with respect to the tank 10 to effect a corresponding adjustment of the receiver unit.

Referring now to Figs. 2, 4, and 6, the casing 31 of the receiver unit includes side walls 81 and 82 that are secured to the rear end wall 34 by upright corner angles 83 and by longitudinal frame angles 84 and 86 at the top and at the bottom of the frame, respectively. Top cross pieces 87 and bottom cross pieces 88 hold the side walls in spaced-apart relation. At the front of the receiver, segmental walls 89 and 91 are secured to the side walls 81 and 82, respectively, being held in place by segmental angles 86a and 88a at the top and bottom of the walls, respectively.

As previously explained, the casing 31 houses a vane system 32 that serves to delimit the portion of the beam admitted to the collector 33. The vane system includes a pair of vertically disposed beam defining vanes 92 and 93, secured to the front end walls 89 and 91 of the receiver casing respectively by suitable securing screws 94. The vanes 92 and 93 are preferably formed of some bombardment-resistant material, such as graphite. It will be noted that the vertical disposition of the vanes 92 and 93 is parallel to the direction of the magnetic field. The vanes 92 and 93 serve as general beam defining vanes for intercepting scattered beam particles and side bands of other than U+ ions and for admitting into the casing 31 a portion of the beam to be further delimited by the delimiting vanes of the system, which will now be described.

As mentioned above, the points of tangency of the arcuate paths of divergent ions of a given mass to an imaginary circular cylinder extend predetermined distances along the imaginary cylinder to either side of the 180° focus position. Thus, a series of ion intercepting or shaving vanes 96, 97, 98, 99, and 100 are disposed in spaced-apart relation on the high-energy side of the receiver throughout the extent of these points of tangency, and a single ion intercepting vane 101 is disposed on the low energy side, immediately opposite the vane 98. These vanes are all formed of suitable material, such as graphite, and are disposed with their longitudinal axes parallel to the magnetic field. The vane 101 is secured by screws 102 to upper and lower angle brackets 103 and 104 respectively, the brackets 103 and 104 being in turn secured to the respective upper and lower angle brackets 84 and 86. A stiffening plate 106 is secured to the upper and lower angle brackets 103 and 104 by bolts 107.

The respective shaving vanes 96 through 100 are similar in form and are similarly mounted. As shown in Figs. 4, 5, and 6, the vane 99 is secured adjacent its ends to support blocks 108 by suitable fastening screws, and the support blocks 108 are suitably secured to respective top and bottom support plates 109, that are in turn secured by fastening screws 110 to the top and bottom cross pieces 87 and 88, respectively. The support blocks 108 are formed of a suitable insulating material, such as "Lavite."

Disposed between the shaving vanes 99 and 100 is a graphite monitoring vane or electrode 111 that is supported similarly to the vanes 96 through 100 and is located with reference to the shaving vane 99 so that a portion of the ions which pass the vane 99 and would impinge upon the vane 100 are intercepted by the monitoring vane, whereby electrons flowing to the monitoring vane to neutralize ions intercepted thereby provide a current giving an indication of the adjustment of the beam. The control exercised by the monitoring electrode will be described in greater detail hereinafter.

The delimited portion of the ion beam that passes through the vane system is received in a pocket structure 112 that includes a frame 113 supported by stand-off insulators 114 on the rear wall 34 of the receiver casing, and that contains a liner 116 of suitable material, such as copper. An opening is provided in the frame 113 and liner 116 for admitting into the pocket structure 112 ions passed by the vane system 32, and this opening may be closed by appropriate adjustment of a pair of sliding doors 117 and 118 having top and bottom edges mounted in respective top and bottom guides 119, which are supported on the housing 113. The doors 117 and 118 have complementary beveled surfaces at their meeting edges to overlap and insure complete closing of the pocket to ions when reception of the ions is not desired. The door 118 carries a pair of racks 121 extending to the right of the door as viewed in Fig. 4. A similar pair of racks 121a is provided at the respective ends of the door 117. These racks 121 and 121a are engaged by a pair of similar pinions 122 (Figs. 4 and 6) carried on a shaft 123 that is supported adjacent its ends by respective bearings 124.

A door operating linkage is operatively connected to the shaft 123 (Fig. 6) and includes a bevel gear connection 126 with a stub shaft 127 supported in a bracket 128 on the shaft 123. The shaft 127 has a universal connection 129 with the operating rod or shaft 72, previously referred to. With such a linkage, turning of the knurled handle 73 of the rod 72 will turn the gears 122 to move the doors 118 and 118a toward each other from the positions shown in Fig. 4 to close the opening to the receiver pocket.

Figure 9:
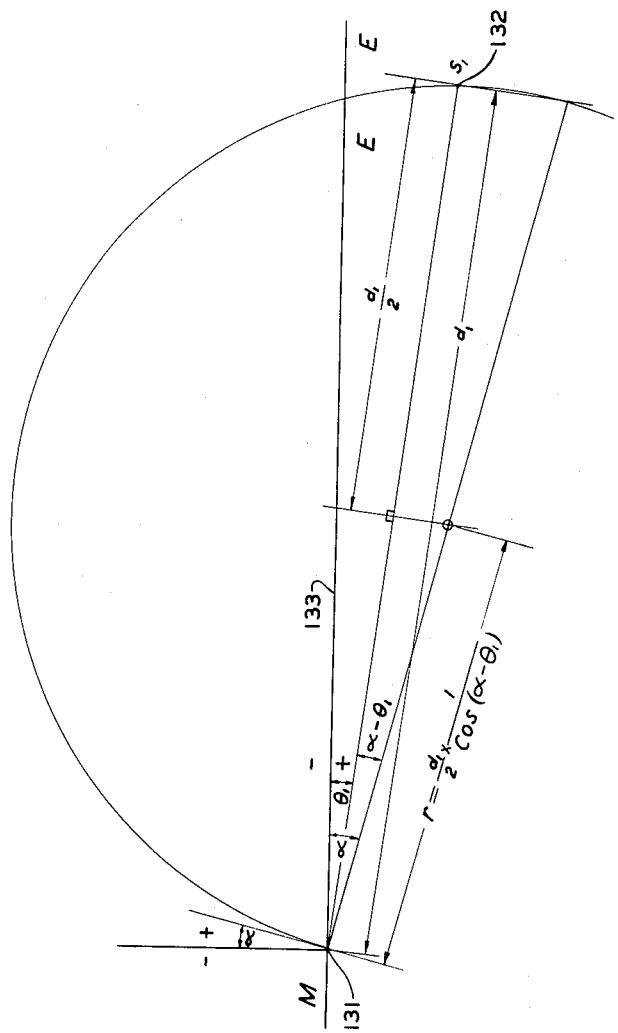

In accordance with my invention, the delimited portion of the beam which is admitted to the receiver pocket 112 is controlled by the positioning of the vanes of the delimiting vane system 32, so that only ions of a desired effective mass and a desired effective angle of departure from the source region are admitted to the pocket. To assist in obtaining this result, I have developed what is called the mass-angle relationship, whereby the exact mass and angle of ions that will pass through a given line parallel to the source unit can be determined. To understand this relation, reference is made to Fig. 9, wherein the point 131 represents the linear virtual focus at the source (extending normal to the plane of the drawing) and wherein the point 132 represents any selected line parallel to the magnetic field (normal to the plane of the drawing) through which ions are to pass, this point being located a distance $d_1$ from the source and at an angle $\theta_1$ from the line 133 which passes through the source and the region of sharpest focus 180° from the source. The orbital radius $r$ of an ion passing through the point 132 and leaving the point 131 at an angle $\alpha$ with the normal to the line 133 is equal to $$\frac{d_1}{2} \times \frac{1}{\cos(\alpha - \theta_1)}$$

It will be assumed that $d_1$ is the maximum distance from the source 131 attained by an ion of mass $M_1$ and radius $r_1$; i. e., $d_1 = 2r_1$. This assumption also means that no ion with a mass less than $M_1$ can reach 132, whereas all ions heavier than $M_1$ can reach or go beyond point 132.

The preceding equation in terms of $r$ and $r_1$ can be rewritten as $$r = \frac{r_1}{\cos(\alpha - \theta_1)}$$

Since $r$ is also equal to $$r_1 \times \sqrt{\frac{M}{M_1}}$$

this equation can be written in terms of mass as $$M = \frac{M_1}{[\cos(\alpha - \theta_1)]^2}$$

This last equation in effect states that an ion having an initial angle of departure $\alpha$ from the source region must have a mass $M$ obtaining from a solution of the last equation given above if the ion is to pass through the point 132.

By appropriate substitution, the above equation can be converted to $$M - M_1 = M_1 \times \tan^2(\alpha - \theta_1)$$

A plot of this final equation gives a curve which is substantially a parabola.

Figure 8:
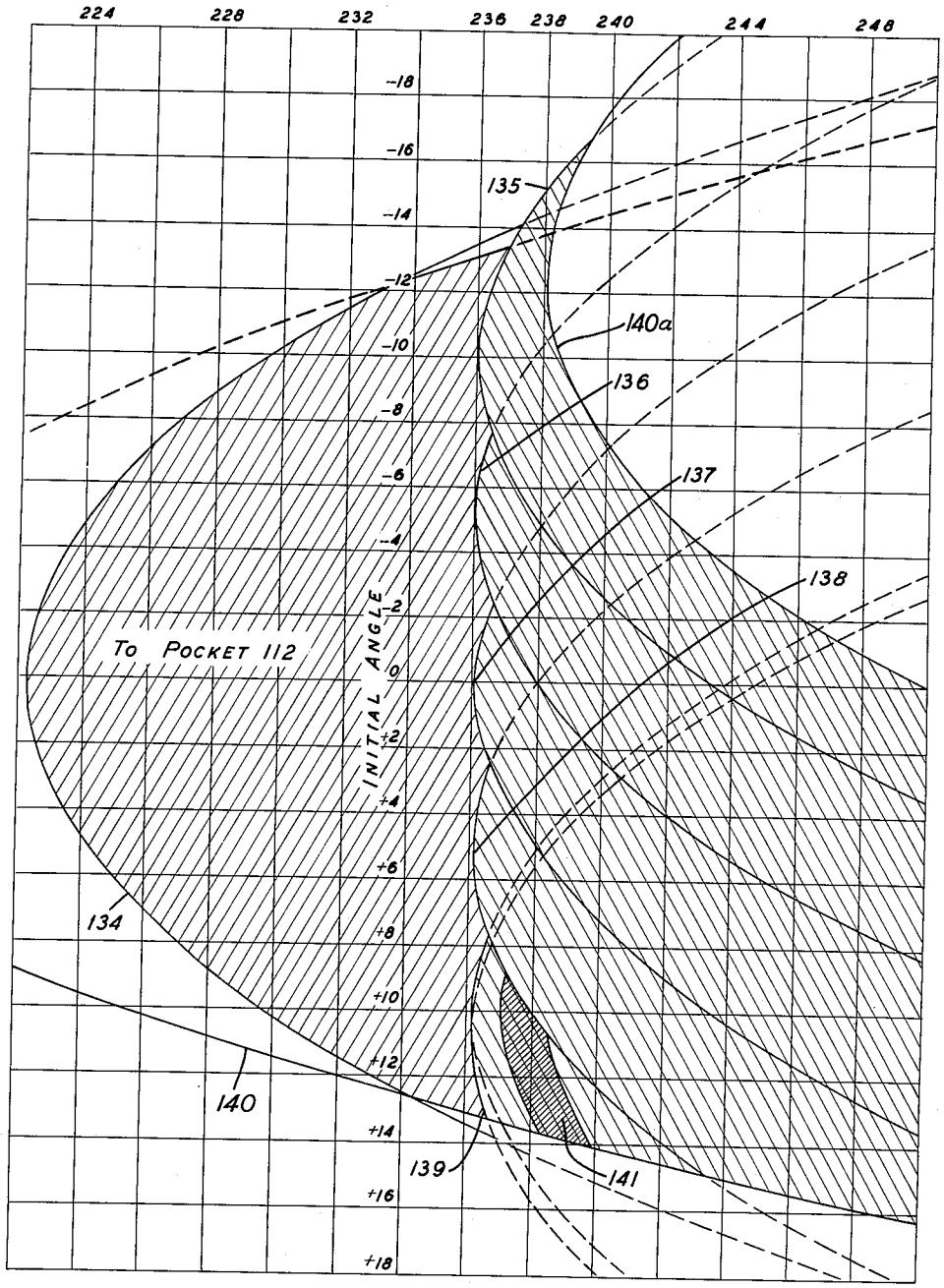
Fig. 8 is a diagrammatic view illustrating the method of plotting the mass and angle of travel of the ions which will impinge upon a member located in the path of the ion beam.

Referring to Fig. 8, a mass angle diagram of the vane system disclosed herein has been made with respect to atomic weights in the range of those of the isotopes of uranium, assuming that the receiver is to be employed to collect material enriched with respect to the $U^{235}$ isotope. The curve 134 in this diagram corresponds to the beam defining edge of the vane 101; the curves 135 through 139 correspond to the beam defining edges of the vanes 96 through 100, respectively; and the curves 140 and 140a correspond to the beam defining edges 92 and 93, respectively. In making the mass angle diagram as shown, it has been assumed that angles to the left of the normal to line 133 (Fig. 9) are negative values of $\alpha$ and angles to the right are positive values of $\alpha$, while angles above the line 133 are negative values of $\theta_1$ and those below are positive values of $\theta_1$.

As indicated by the diagram, only ions having initial angles of departure from the source 131 in the range of about ±12° and having masses in the range of about 222 mass units to 236 mass units will be passed by this vane system. It will be understood, however, that some material of greater mass, comprising ions arriving at the receiver with less than full energy, will, in practice, also be passed by the vane system. This condition will result because, for some reason, certain ions do not receive full energy in the source region, and others suffer a change of direction or loss of energy by virtue of collisions in the beam. In order to take into consideration the ions of low energy arriving at the receiver under such conditions, the ions passing through the beam delimiting vane system may be referred to herein as having certain "effective" initial angles of departure from the source and certain "effective" masses. Thus, interpreting the mass angle diagram, it will be noted that the shaded area lying between the curve 134 and the curves 135 through 139 represents the effective mass and effective angle of ions which will pass through the beam delimiting vane system.

The shaded area 141 in Fig. 8 illustrates the ions that will impinge upon the monitoring electrode 111, and it will be noted that the area 140 indicates that the electrode 111 is disposed to receive ions in the region of mass 238 so that the beam is focused properly with repect to the receiver when the current to the electrode 111 is a maximum.

Figs. 10 and 11 illustrate a modified form of monitoring electrode 111a that is positioned with respect to a shaving electrode or vane 98a, opposite the delimiting vane 101, so that the portion of the beam reaching the electrode 111a is determined in part by the partial shading thereof afforded by the vane 98a. As seen by the shaded area 137a in Fig. 11, the ions received by the electrode 111a are again substantially symmetrical with respect to the 238 mass position, so that the beam is properly focused with respect to the receiver when the current to the electrode 111a is a maximum.

Figure 7:
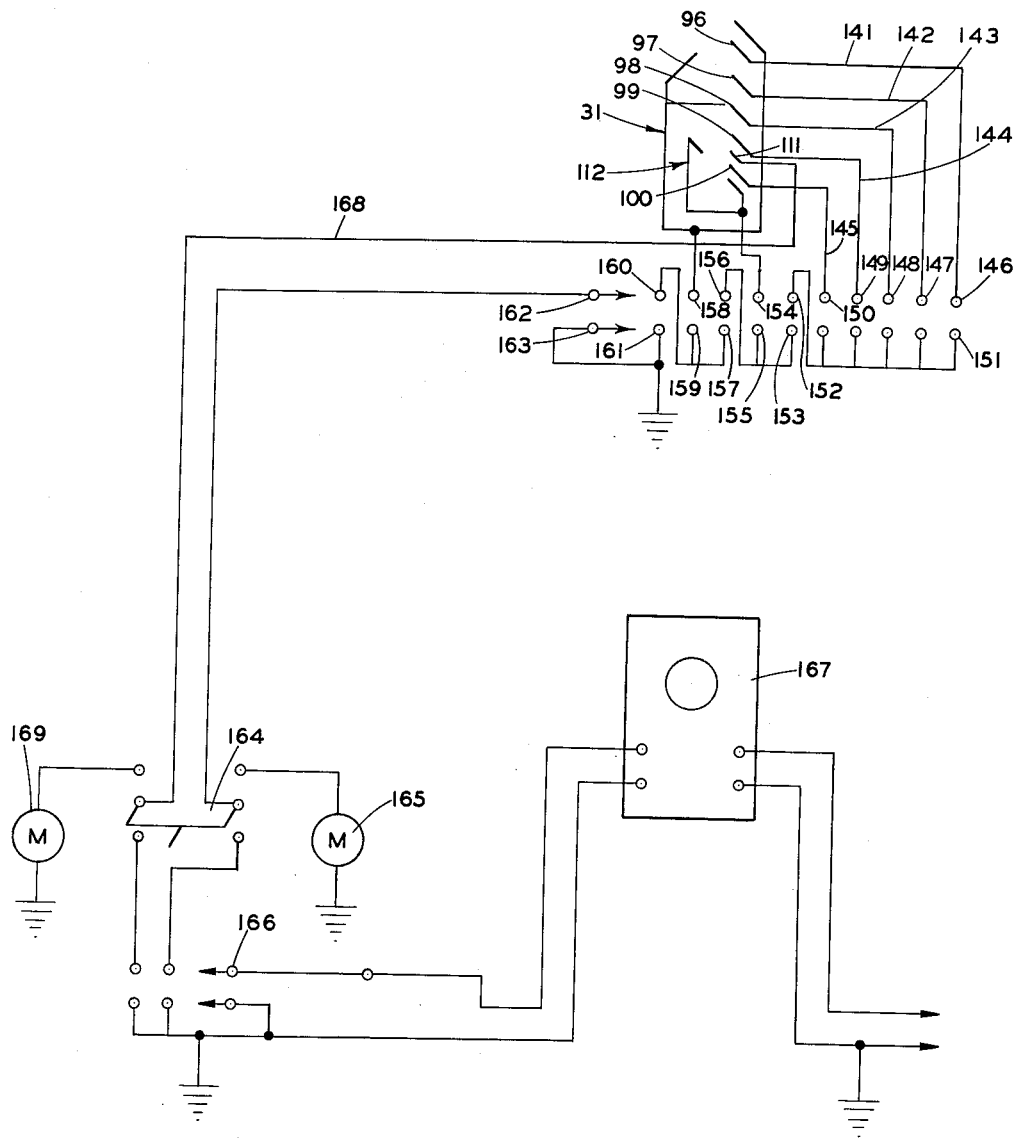
Fig. 7 is a schematic wiring diagram illustrating the metering circuit associated with the receiver unit.

As previously explained, the various vanes 96 to 100 and the pocket structure 112 are carried by insulating mountings, whereby the electron currents flowing to each of these vanes and to the pocket structure to neutralize the ions impinging thereon may be read by means of the electrical circuit shown in Fig. 7. Various leads 141 to 145 are connected to the vanes 96 to 100, respectively, and to terminals 146 to 150, respectively, of a suitable rotary switch arrangement, which is illustrated schematically in Fig. 7. A series of terminals 151 are associated respectively with the terminals 146 to 150 and are connected in parallel to a common terminal 152. The terminal 152 has associated therewith an opposing terminal 153, which, together with the pocket terminals 154 and 155, may be associated with a terminal 156 having an opposing terminal 157. A terminal 158 for the receiver housing is associated with an opposed terminal 159, which is connected with the terminal 157 to a terminal 160 of a final pair of terminals 160 and 161. The contactors 162 and 163 may be connected in any of the stations represented by the two rows of terminals, so that individual currents to the various vanes 96 to 100, to the pocket structure 112, or to the entire receiver casing 31 may be connected separately or in any of several combinations to a double-throw switch 164. In one position the switch 164 places the various terminals selected by the above described rotary switch in series with a meter 165, and in the other position connects these terminals through a selective switching arrangement 166 to an oscilloscope 167 to control the vertical deflection plates thereof. Also, the monitoring electrode 111 is connected through the lead 168 to the other side of the double-throw switch 164 and may be selectively connected to the meter 169 or to the oscilloscope 167.

To summarize briefly the operation of the above described apparatus, it is assumed that the source unit has been placed in operation with a charge of a compound of normal uranium, such as $UCl_4$, and that the relative value of the accelerating voltage at the ion source with respect to the strength of the magnetic field has been so adjusted that the current to the monitoring electrode 111 or 111a is at a maximum. With this condition prevailing, the bulk of the $U^{238}$ ions will impinge upon and be intercepted by the shaving vanes 96 to 100, as shown by the mass-angle diagram of Fig. 8, with the portion of the beam passed by the vane system being determined in part by the beam delimiting vanes 92, 93, and 101. In general, the ions of mass 235 will be passed by the vane system (see Fig. 8) as well as any other ions whose "effective" mass and angle of departure from the source region is the same as the $U^{235}$ ions. In other words, if a $U^{238}$ ion suffers a collision in the beam or for some reason fails to receive full energy in leaving the source region, it may arrive at the receiver within the portion of the beam passed by the vane system. That portion of the beam will be received within the collector pocket 116, deionized, and retained in the pocket so that a portion of the material enriched with respect to the $U^{235}$ isotope, compared to normal uranium, will be collected and retained in the pocket 112.

While a preferred embodiment of the invention has been described herein, it is apparent that numerous modifications may be made therein, and it is intended to cover in the appended claims all such modifications as fall within the true spirit and scope of the invention.

What is claimed is:

1. In an isotope separator having means for establishing an ion beam and means for effecting a momentum separation of ions of different mass in said beam, a collector, and a series of beam delimiting vanes disposed anteriorly of said collector along one side of said beam at a region of focus thereof and at least one beam delimiting vane disposed on the opposite side of said beam at said region of focus for intercepting a selected portion of said beam while passing the remainder thereof to said collector.

2. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising a series of ion intercepting vanes disposed along one side of the beam path and at least one ion intercepting vane disposed at the other side of the beam path.

3. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising an arcuate array of ion intercepting vanes disposed along one side of the beam path and at least one ion intercepting vane disposed at the other side of the beam path.

4. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising a series of ion intercepting vanes disposed along one side of the beam path to intercept ions of a given mass and an additional ion intercepting vane disposed at the other side of the beam path adjacent the position of sharpest focus of said beam, and a collector positioned to receive ions passed by said vane system.

5. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising a series of ion intercepting vanes disposed along one side of the beam path to intercept ions of a given mass and at least one additional ion intercepting vane disposed at the other side of the beam path to intercept ions of a smaller given mass, and a collector positioned to receive ions of intermediate mass passing through said vane system.

6. In an isotope separator having means for establishing an ion beam and means for effecting a momentum separation of ions of different mass in said beam in such manner that ions of a given mass arrive at a region of focus with their paths tangent to a common imaginary circular cylinder, a series of ion intercepting vanes located adjacent said region of focus with similar edges externally tangent to a first selected imaginary circular cylinder coaxial with said first-mentioned cylinder, and an additional ion intercepting vane spaced from an intermediate one of said series of vanes with one edge internally tangent to a second selected imaginary circular cylinder coaxial with and smaller in diameter than said first selected cylinder.

7. In an isotope separator having means for establishing an ion beam and means for effecting a momentum separation of ions of different mass in said beam in such manner that ions of a given mass arrive at a region of focus with their paths tangent to a common imaginary circular cylinder, a series of ion intercepting vanes located adjacent said region of focus with similar edges externally tangent to a selected imaginary circular cylinder coaxial with said first-mentioned cylinder for intercepting a selected portion of said beam, an additional ion intercepting vane spaced from an intermediate one of said series of vanes and positioned to permit a second selected portion of the beam to pass therebetween while intercepting a third selected portion of the beam, and a collector disposed to receive ions passing between said additional ion intercepting vane and said series of vanes.

8. In an isotope separator having means for establishing an ion beam and means for effecting a momentum separation of ions of different mass in said beam in such manner that ions of a given mass arrive at a region of focus with their paths tangent to a common imaginary circular cylinder, a series of ion intercepting vanes located adjacent said region of focus with similar edges externally tangent to a first selected imaginary circular cylinder coaxial with said first-mentioned cylinder, an additional ion intercepting vane spaced from said series of vanes and located adjacent the position of sharpest focus of said beam with one edge internally tangent to a second selected imaginary circular cylinder coaxial with and smaller in diameter than said first selected cylinder, and a collector disposed to receive ions passing between said additional ion intercepting vane and said series of vanes.

9. In an isotope separator having means for establishing an ion beam and means for effecting a momentum separation of ions of different mass in said beam in such manner that ions of a given mass arrive at a region of focus with their paths tangent to a common imaginary circular cylinder, a series of ion intercepting vanes located adjacent said region of focus with similar edges externally tangent to a selected imaginary circular cylinder coaxial with said first-mentioned cylinder for intercepting ions of a first selected effective mass, an additional ion intercepting vane spaced from an intermediate one of said series of vanes and positioned to permit ions of a second selected smaller effective mass to pass therebetween while intercepting ions of a still smaller effective mass, and a collector disposed to receive ions passing between said additional ion intercepting vane and said series of vanes.

10. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in said region of focus and comprising a series of spaced apart ion intercepting members so disposed in the path of the outer portion of said beam that their innermost edges define a circular cylindrical surface having its axis coincident with said linear virtual focus, and at least one ion intercepting member disposed in the path of the inner portion of said beam adjacent said areas of sharpest focus.

11. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in said region of focus and comprising a series of spaced apart ion intercepting members so disposed in the path of the outer portion of said beam that their innermost edges define a circular cylindrical surface having its axis coincident with said linear virtual focus, said ion intercepting members extending outwardly from said cylindrical surface sufficiently to intercept substantially all ions in said beam passing outwardly beyond said cylindrical surface, and at least one ion intercepting member disposed in the path of the inner portion of said beam adjacent said areas of sharpest focus.

12. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in said region of focus and comprising a series of spaced apart ion intercepting members so disposed in the path of the outer portion of said beam that their innermost edges define a circular cylindrical surface having its axis coincident with said linear virtual focus, said series of ion intercepting members extending along said cylindrical surface the same angular distance to either side of said common plane, and at least one ion intercepting member disposed in the path of the inner portion of said beam adjacent said common plane.

13. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in said region of focus and comprising a series of spaced apart ion intercepting members so disposed in the path of the outer portion of said beam that their innermost edges define a circular cylindrical surface having its axis coincident with said linear virtual focus, said series of ion intercepting members extending along said cylindrical surface an angular distance to either side of said common plane equal to the maximum angular divergence of ions to either side of a median ion path from said linear virtual focus, and at least one ion intercepting member disposed in the path of the inner portion of said beam adjacent said common plane.

14. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising a series of ion intercepting vanes disposed along one side of the beam path for intercepting selected ions in the beam and an electrode disposed between an adjacent pair of said vanes for intercepting a selected fractional portion only of the ions passed by one of said pair of vanes and traveling toward the other.

15. In an isotope separator having means for establishing an ion beam and means for effecting a momentum separation of ions of different mass in said beam to cause ions of different mass to be focused in adjacent positions in a region of focus of the beam, a beam delimiting vane system disposed in said region of focus and comprising a series of ion intercepting vanes disposed along one side of the beam path for intercepting selected ions in the beam, one of said vanes being of reduced width to pass ions of selected effective mass and energy ranges, and an electrode disposed to intercept said ions of selected effective masses and angles of travel.

16. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in said region of focus and comprising a series of spaced apart ion intercepting members so disposed in the path of the outer portion of said beam that their innermost edges define a circular cylindrical surface having its axis coincident with said linear virtual focus, said ion intercepting members extending outwardly from said cylindrical surface sufficiently to intercept substantially all ions in said beam passing outwardly beyond said cylindrical surface, and an electrode positioned between an adjacent pair of said ion intercepting members for intercepting a predetermined portion of the ions of said beam passed by one of said pair of members and traveling toward the other of said pair of members.

17. In a calutron including a substantially uniform magnetic field and means for projecting a beam of ions of a polyisotopic material along a generally arcuate path transversely through said magnetic field to a region of focus disposed substantially 180° along said path from the source of the beam, said beam being characterized by divergence of ions within predetermined limits as they travel from a linear virtual focus parallel to said magnetic field adjacent the source of the beam and convergence of ions toward respective areas of sharpest focus of beam components of different mass, with said areas of sharpest focus defining a common plane containing said linear virtual focus, an ion receiver disposed in the region of said areas of sharpest focus and comprising a series of spaced apart ion intercepting members so disposed in the path of the outer portion of said beam that their innermost edges define a circular cylindrical surface having its axis coincident with said linear virtual focus, said ion intercepting members extending outwardly from said cylindrical surface sufficiently to intercept substantially all ions in said beam passing outwardly beyond said cylindrical surface, and an electrode positioned between an adjacent pair of said ion intercepting members, said electrode extending in a direction normal to said cylindrical surface a distance substantially less than said ion intercepting members for intercepting a predetermined fractional portion only of the ions of said beam passed by one of said pair of members and traveling toward the other of said pair of members, the position of said electrode being so chosen that its rate of ion interception is a maximum when each of said ion intercepting members is intercepting ions of selected effective masses and angles of travel.

18. In combination with a calutron receiver having a collector and a plurality of ion intercepting members disposed anteriorly of said collector for defining an ion path leading thereto, a control circuit for said receiver comprising a current reading device and a selective circuit network between said current reading device and said ion intercepting members, said selective circuit network being adjustable to connect said current reading device selectively to said ion intercepting members.

19. A control circuit for a calutron receiver having a collector and a plurality of ion intercepting members disposed anteriorly thereof for defining an ion path leading to the collector, said control circuit comprising a current reading device and a selective circuit network for selectively connecting said current reading device to the ion intercepting members of said receiver.

No references cited.